United States Patent
Johnson et al.

(12) United States Patent
Johnson et al.

(10) Patent No.: US 8,379,487 B2
(45) Date of Patent: Feb. 19, 2013

(54) BOTTOM REFERENCED VIBRATORY SOURCES FOR SHALLOW WATER ACQUISITION

(75) Inventors: Marvin L. Johnson, Chromo, CO (US); Michael W. Norris, Cypress, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 512 days.

(21) Appl. No.: 12/669,732

(22) PCT Filed: Jul. 9, 2008

(86) PCT No.: PCT/US2008/008412
§ 371 (c)(1), (2), (4) Date: Jan. 19, 2010

(87) PCT Pub. No.: WO2009/023072
PCT Pub. Date: Feb. 19, 2009

(65) Prior Publication Data
US 2010/0188930 A1 Jul. 29, 2010

Related U.S. Application Data

(60) Provisional application No. 60/964,256, filed on Aug. 10, 2007.

(51) Int. Cl.
*G01V 1/155* (2006.01)
(52) U.S. Cl. ........................................................ 367/189
(58) Field of Classification Search .................. 367/141, 367/143, 174, 189; 181/113, 114, 401, 402, 181/122
See application file for complete search history.

(56) References Cited

U.S. PATENT DOCUMENTS

| | | | |
|---|---|---|---|
| 3,363,720 A * | 1/1968 | Mifsud et al. | 367/190 |
| 3,365,019 A | 1/1968 | Bays | 181/0.5 |
| 3,482,646 A | 12/1969 | Brown et al. | 181/0.5 |
| 3,885,646 A | 5/1975 | Knight et al. | 181/114 |
| 4,051,918 A | 10/1977 | Rogers | 181/119 |
| 4,153,135 A | 5/1979 | Bouyoucos | 181/120 |
| 4,295,213 A | 10/1981 | Mifsud | 367/41 |
| 4,334,592 A | 6/1982 | Fair | 181/121 |
| 4,658,387 A | 4/1987 | Dolengowski et al. | 367/144 |
| 4,705,137 A | 11/1987 | Fair | 181/120 |
| 4,715,020 A | 12/1987 | Landrum et al. | 367/38 |

(Continued)

OTHER PUBLICATIONS

Krohn, C. et al. (2003) "High Fidelity Vibratory Seismic (HFVS) I: Enhanced Data Quality," *73rd Annual International Meeting, SEG, Expanded Abstracts*, pp. 43-46.

(Continued)

*Primary Examiner* — Isam Alsomiri
*Assistant Examiner* — Krystine Breier
(74) *Attorney, Agent, or Firm* — ExxonMobil Upstream Research Company Law Dept.

(57) ABSTRACT

The described invention relates to seismic acquisition means for use in shallow water marine environments, comprising: (a) a vessel (1) having at least one hull (25); (b) one or more shaker (13) and baseplate (12) assemblies affixed to the vessel by two or more rigid supporting elements (11) adapted to be capable of lowering said assemblies from the vessel hull to a shallow water bottom (14) and of raising said assemblies from the shallow water bottom to the hull; and, wherein each of said assemblies comprise one or more vibrator units mounted on a baseplate that is adapted to rest upon the shallow water bottom and to transmit vibratory signals from the vibrator units into said water bottom. The described invention provides a high-amplitude, broadband seismic signal, provides high data-production rates, couples energy directly into the earth and minimizes damage to the water bottom.

16 Claims, 2 Drawing Sheets

U.S. PATENT DOCUMENTS

| | | | |
|---|---|---|---|
| 4,823,326 A | 4/1989 | Ward | 367/41 |
| 4,867,096 A | 9/1989 | Cole | 181/114 |
| 4,982,374 A | 1/1991 | Edington et al. | 367/48 |
| 5,000,285 A | 3/1991 | Airhart | 181/113 |
| 5,031,718 A * | 7/1991 | Peavey | 181/114 |
| 5,128,906 A | 7/1992 | Cole | 36/143 |
| 5,410,517 A | 4/1995 | Andersen | 367/75 |
| 5,550,786 A | 8/1996 | Allen | 367/48 |
| 5,715,213 A | 2/1998 | Allen | 367/48 |
| 5,719,821 A | 2/1998 | Sallas et al. | 367/41 |
| 5,721,710 A | 2/1998 | Sallas et al. | 367/41 |
| 5,790,473 A | 8/1998 | Allen | 367/57 |
| 5,978,316 A * | 11/1999 | Ambs et al. | 367/134 |
| 6,065,562 A * | 5/2000 | Bird et al. | 181/113 |
| 6,105,712 A | 8/2000 | Lieng et al. | 181/114 |
| 6,612,396 B1 | 9/2003 | Chelminski et al. | 181/113 |
| 7,377,357 B2 | 5/2008 | Duren | 181/121 |
| 2006/0096518 A1 * | 5/2006 | Hulbert | 114/357 |
| 2006/0193203 A1 | 8/2006 | Tenghamn et al. | 367/20 |
| 2007/0157864 A1 | 7/2007 | Aldin et al. | 114/281 |

OTHER PUBLICATIONS

Krohn, C. et al. (2003) "High Fidelity Vibratory Seismic (HFVS) II: Superior Source Separation," *73rd Annual International Meeting, SEG, Expanded Abstracts*, pp. 47-50.

PCT International Search and Written Opinion dated Oct. 1, 2008, 8 pgs.

* cited by examiner

BOTTOM REFERENCED VIBRATORY SOURCES FOR SHALLOW WATER ACQUISITION

CROSS REFERENCE TO RELATED APPLICATIONS

This application is a National Stage entry under 35 U.S.C. 371 of PCT/US2008/08412 that published as WO 2009/023072 and was filed on Jul. 9, 2008 and claims the benefit of U.S. Provisional application 60/964,256 which was filed on Aug. 10, 2007.

FIELD OF INVENTION

This invention relates generally to the field of geophysical prospecting, and more particularly to seismic data acquisition. Specifically, this invention relates to data acquisition using vibratory energy sources in shallow water and transition zone environments.

BACKGROUND OF INVENTION

There have been significant operational, technical and environmental constraints associated with the energy sources used for seismic acquisition in shallow water areas and in transitional zone areas (i.e. areas that lie between dry land and open water). The operational constraints are primarily associated with the achievable data production rates, i.e. the rate at which seismic data can be acquired with a fixed amount of seismic equipment. Seismic equipment is expensive, and the per-day cost of using a piece of equipment is significant. Technical concerns are associated with the recoverable bandwidth and the amplitude of the source signal above the ambient noise conditions. Environmental concerns are the source's impact on marine life and the impact on the water bottom.

To create seismic images that are adequate for use in the exploration and production of oil and gas, the energy source must provide recoverable energy over a frequency range from six hertz to above one-hundred hertz and at amplitude levels significantly above the ambient noise environment. Additionally the energy source must be capable of operating at an acceptable production rate. Types of sources that have been used or proposed for shallow water seismic acquisition include small air gun arrays, auger air guns, explosive charges, accelerated weight drops, water column vibrators and bottom referenced vibrators or combinations of these sources.

Devices such as the accelerated weight drops and bottom referenced vibrators are capable of providing adequate energy in the desired bandwidth; but they also have the potential to significantly damage the water bottom. Placing a vibratory source in the water column or at the water surface eliminates the potential for damage to the water bottom; but reduces signal power per device, uses the water column to couple energy into the earth and significantly reduces the energy below twelve to fifteen hertz. A reduction in the frequency components below twelve to fifteen hertz dramatically reduces the potential to adequately image for deep seismic data. The reduction in the low frequency components can be compensated for by increasing the dwell time for the lower frequency components; but this technique can significantly increase the time spent for each source point with a corresponding increase in the cost and time duration of the seismic survey.

So bottom referenced vibrators show better potential for seismic data acquisition, but can be more damaging to the environment. In early U.S. Pat. No. 3,365,019, a vibrator system is housed in an earth coupling or foot member that engages the soft waterbed bottom with a cup-like, cylinder-shaped object after being lowered by a cable from a suitable vessel or vehicle. Vacuum creating means are included in the coupling member to assure adequate contact with the water-bottom surface. When removal or transfer to a different location is desired, the vacuum is replaced with an over-pressure from a suitable air pump for disengagement. It is clear that sub-surface penetration is required as are power sources for adjusting the pressure in the coupling element. U.S. Pat. No. 4,867,096 uses a cable suspended, pointed rod to penetrate water-bottom areas and to provide vibratory signals directly into that sub-surface. The vibratory source is affixed at the top of the rod to impart the vibration transmitted into the earth by the rod; the whole assembly is again lowered by cable from an attending vehicle or vessel suitable for use in marshlands or shallow water. Again, penetration can damage sensitive wetlands and power sources adequate to withdraw the rod can become burdensome economically and physically when trying to minimize overall system weight. Another rod or pipe method is provided in U.S. Pat. No. 5,031,718. Here the elongated coupling means extends from the vessel or vehicle, seats on the bottom and engages it. A driver means is used to created sound in the coupling, and can be on the vessel or vehicle, or can be located in the baseplate system. In soft bottoms often present in shallow waters or promising marshlands, significant penetration is likely with the recommended coupling, such as the suggested pipeline section. Similar problems as noted for U.S. Pat. No. 4,867,096 can be anticipated.

For shallow water seismic acquisition, an energy source is needed that provides a high-amplitude, broadband seismic signal, provides high data-production rates, and couples energy directly into the earth and minimizes damage to the water bottom.

SUMMARY OF THE INVENTION

In a principal embodiment, the invention is a seismic source system for use in shallow water marine environments, comprising: (a) a vessel having at least one hull; (b) one or more shaker and baseplate assemblies affixed to the vessel by two or more rigid supporting elements adapted to be capable of lowering said assemblies from the vessel hull to a shallow water bottom and of raising said assemblies from the shallow water bottom to the hull; and, wherein each of said assemblies comprise one or more vibrator units mounted on a baseplate that is adapted to rest upon the shallow water bottom and to transmit vibratory signals from the vibrator units into said water bottom.

In a preferred embodiment said vessel has two hulls and said one or more shaker and baseplate assemblies are of a size that when raised will fit within the space between the hulls. Typically, the vessel, either mono-hull or twin-hull, or more, will be equipped with ballast water tanks to be used to trim the vessel and to provide hold-down weight. Further, said one or more rigid supporting elements can be adapted to allow lifting of the vessel above its normal hull waterline to provide hold-down weight on the one or more shaker and baseplate assemblies and/or are adapted to be capable of independent lifting to allow adjustment of baseplate alignment with the water bottom without significant change to the trim of the vessel.

The shaker and baseplate assemblies are at least equivalent to the water-line size of the vessel hull, or hull outline if more than one, or larger, to spread the exerted pressure for minimizing the environmental impact on the water bottom. In a preferred embodiment, the baseplate(s) will be covered with a flexible membrane adapted to be in contact with the water bottom that is adapted to be raised in parts until complete separation from the water bottom can be achieved where the water bottom makes separation difficult. The shaker and baseplate assemblies may also comprise at least one sensing plate attached to a rod connected to a syncro-resolver for determining the penetration of the baseplate into the water bottom to allow modification of the seismic source signal, or stoppage, and/or readjustment of the hold-down weight to readjust said penetration.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

Figure 1:
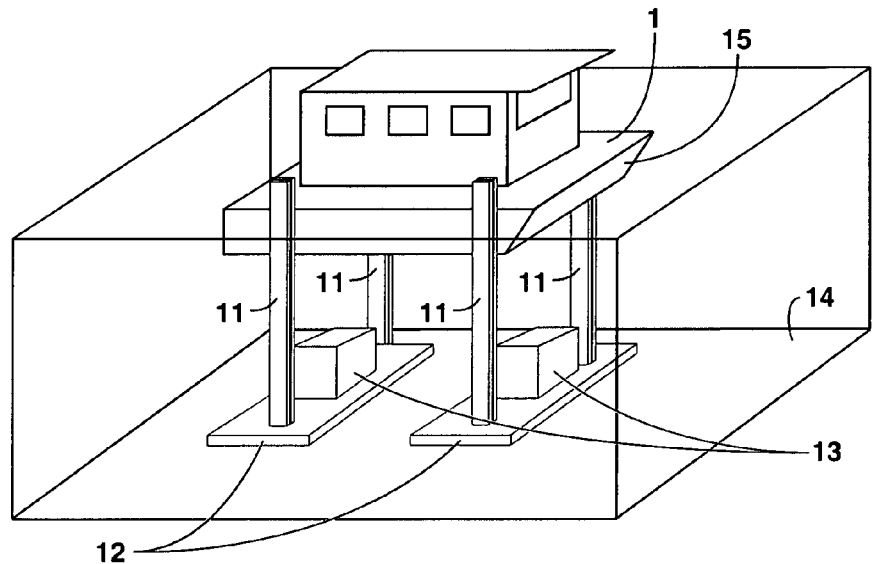
FIG. 1 illustrates a bottom referenced vibrator system utilizing two shaker and baseplate assemblies.
Figure 2:
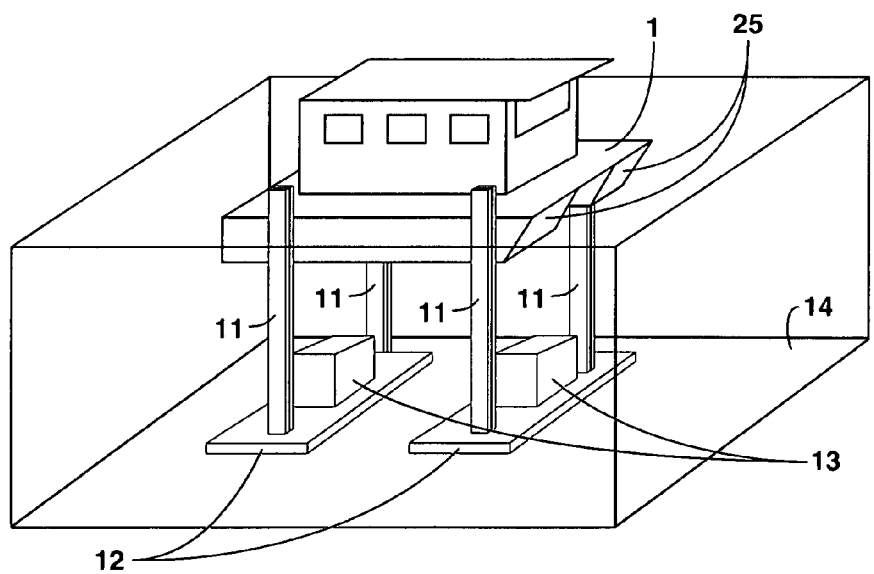
FIG. 2 illustrates a bottom referenced vibrator system utilizing two shaker and baseplate assemblies and a catamaran style vessel to allow the shaker assemblies to be accessed; and, FIG. 3 illustrates a bottom referenced vibrator system with the shaker and baseplate assemblies retracted into the area between the two hulls of a catamaran style vessel.

The present invention is a seismic source that provides significant low frequency signal components and efficient rates of data acquisition while having minimal or no impact to the environment. This seismic source utilizes an energy source system combining one or more large shaker and baseplate assemblies affixed to a shallow draft vessel such that the assemblies may be raised and lowered as needed. Two different embodiments of the invention are shown in FIG. 1 and FIG. 2. Both drawings are shown with two shaker and baseplate assemblies, but any number of such assemblies per vessel can be used. Preferably the assemblies will have a baseplate face size that is approximately equal to the water "imprint" area of the hull. Where more than one assembly is used, the combined areas of the assemblies will be approximately this size. Preferably the baseplate face size will be larger than the hull imprint size to improve vessel stability.

Figure 3:
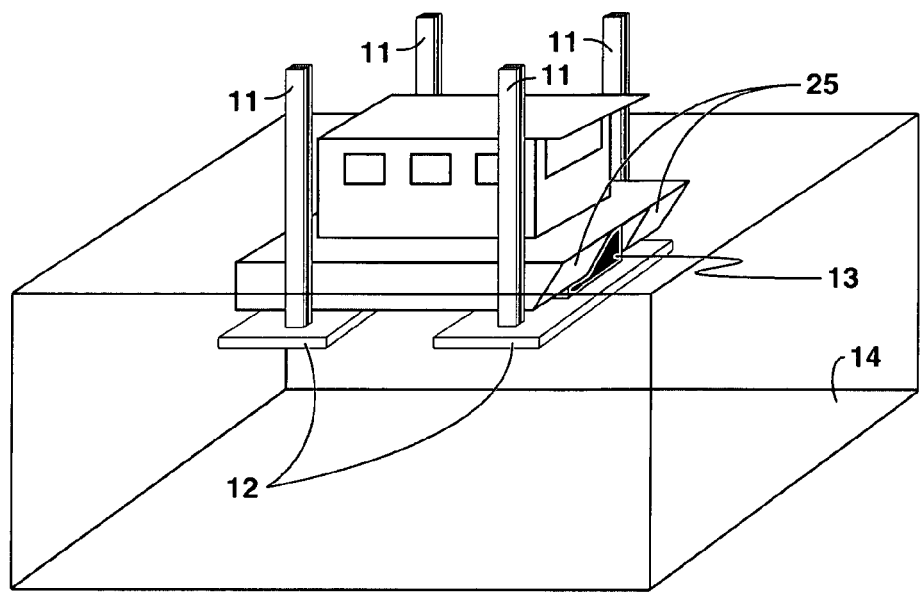

FIG. 3 shows the shaker and baseplate assemblies retracted to the shallowest draft position. Just as land vibrators partially retract the baseplate when moving between successive source locations, a bottom referenced vibrator only needs to raise the baseplate a few inches so as to pass over any obstructions.

When single multiple shaker/baseplate assemblies are used on a vessel, the assemblies are selected from those capable of generating compressional waves, shear waves, P-waves, or S-waves. The assemblies may be the same or different, e.g., some assemblies can generate P-waves and some shaker assemblies generate S-waves. Vibratory sources capable of generating these wave forms are well known and available commercially. Other vibroseis/processing methodologies include, for example: U.S. Pat. No. 5,410,517 (Method for cascading sweeps for a seismic vibrator); U.S. Pat. No. 4,982,374 (Method of source coding and harmonic cancellation for vibrational geophysical survey sources); U.S. Pat. No. 4,823,326 (Seismic data acquisition technique having superposed signals); U.S. Pat. No. 4,715,020 (Simultaneous performance of multiple seismic vibratory surveys); and U.S. Pat. No. 4,295,213 (Composite seismic signal).

High Fidelity Vibratory Seismic Methods ("HFVS"), in particular the methods described in U.S. Pat. Nos. 5,719,821, 5,721,710, 5,790,473, and references cited therein, are preferred acquisition methods for use with the present inventive apparatus in shallow water seismic acquisition. The HFVS method records the motion of the baseplate and reaction mass; more particular details are presented in C. Krohn, and M. Johnson, 2003, High fidelity vibratory seismic (HFVS) I: Enhanced data quality: 73rd Annual International Meeting, SEG, Expanded Abstracts, 43-46 and Krohn, C., and M. Johnson, 2003, High fidelity vibratory seismic (HFVS) II: Superior source separation: 73rd Annual International Meeting, SEG, Expanded Abstracts, 47-50. Doing so allows the expected variations in the water bottom conditions to be accommodated and allows for a consistent source signature (precise force as a function of time actually transmitted to the ground, as contrasted with the user-designed pilot waveform used in the vibrator control electronics). Additionally, HFVS style operation facilitates the simultaneous acquisition of P-wave and S-wave energy and can be used to improve the production rate when multiple source devices are used in tandem.

Use of HFVS type operation is to be accommodated for use in the shaker/baseplate assemblies of the invention where the mechanical movement, from electrical or hydraulic (including electro-hydraulic) actuation, creating the vibration signals are waterproofed or carried in a water-proof housing located on the upper surface of the baseplate. Electrical or hydraulic power can be provided from the vessel and provided to the shaker/baseplate assembly by either of independent cables, or hoses, and the like, or by such attached or integrated into the supporting elements.

The rigid supporting elements can be of any structural design capable of being connected to the shaker/baseplate assembly and of being used to lift and lower said assembly. Excess weight should typically be avoided so I-beams, or hollow tubular rods having square, rectangular, triangular, or circular cross-section, and the like, will all be suitable. Similarly, such structural support elements can have holes, or cut out sections, to permit water entry and more neutral water weight. Attachment of the shaker/baseplate assembly to at least two such supporting elements is preferred, but single supporting elements are possible where the effective diameter of a hollow tubular rod is within an effective percent of the shortest dimension of the baseplate, e.g., at least about 20%. Such should be made of or constructed from materials having water corrosion-resistance, or capable of being treated to have such, yet having the structural strength to support the weight of the shaker/baseplate assemblies, or even the strength to support at least a portion of the weight in water of the attending vessel, e.g., stainless steel, treated steel alloys, and the like.

FIG. 1 illustrates a shallow draft vessel 1 with suitable rigid supporting elements 11 affixed to a single hull 15. To these are attached two lowered baseplate 12 and shaker 13 assemblies to permit the bottom surfaces of the baseplates to contact the water bottom 14. The supporting assemblies 11 preferably are isolated from the baseplate 12 and shaker 13 assemblies by air bag or spring assemblies (not shown) so as to avoid vibration from the vibratory sources on the baseplate. While operating, water can be pumped into or out of holding, or ballast, tanks (not shown) on the vessel 1 to alter the baseplate hold-down weight. Additionally, the supporting elements 11 can be structured such that they can be independently raised or lowered, i.e., such can be adapted to be capable of independent lifting to allow adjustment of baseplate 12 alignment with the water bottom without significant change to the trim of the vessel 1. The support lifting apparatus can be of any type suitable for lifting the described supporting elements 11, for example, use of hydraulic lift columns could be used in shallow waters. For deeper water, a cog wheel mounted and powered on the vessel with a track arrangement on the supporting element will be preferred, e.g., a tracked I-beam.

To transit between work sites, the baseplate 12 and shaker 13 assemblies are positioned near the hull 15, bottom or sides, of the vessel 1. During operation, the baseplate 12 and shaker 13 assemblies remain in contact with the water bottom 14. To move between successive source locations, the baseplate 12 and shaker 13 assemblies will need to be raised only to a height that will allow the baseplate 12 to pass over any water bottom obstructions. Thus bottom viewing equipment or depth determining equipment, e.g., television or sonar, could usefully supplement where economically acceptable. This minimal raising allows for rapid movement between successive source points and can significantly improve the production rate when compared to systems that require the shaker assemble to be completely recovered between successive source points.

Figure 4:
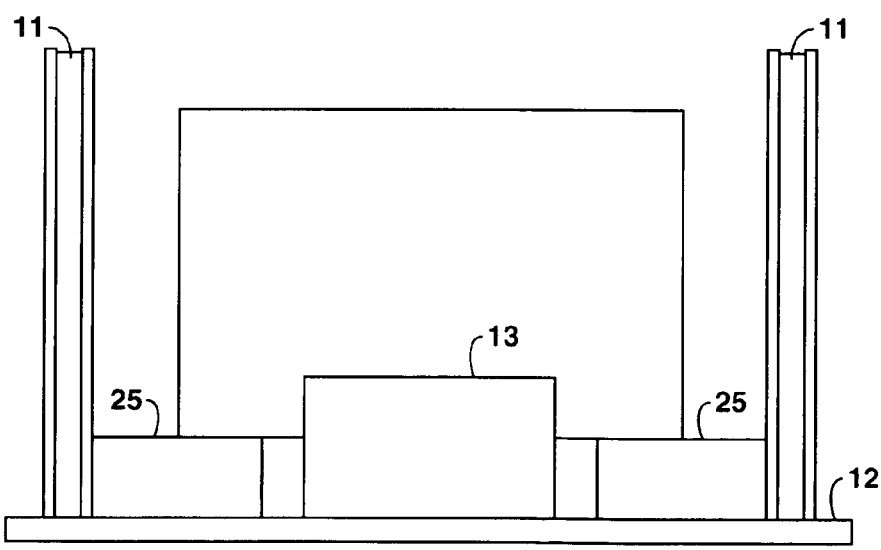
FIG. 4 illustrate the cross section of a bottom referenced vibrator system with the shaker and baseplate assemblies retracted into the area between the two hulls of a catamaran style vessel.

To facilitate maintenance and maximize the range of depths over which the units can work, a multiple hull or catamaran style vessel can be used as show in FIG. 2. This arrangement, i.e., the space between the twin hulls 25, allows the shaker assemblies (comprising rigid element 11, baseplate 12, and shaker unit 13) to be brought completely out of the water, as shown in FIG. 3, for maintenance and for transiting to the work site. A cross-section of the raised shaker assemblies within the twin hulls is presented in FIG. 4. A similar benefit could be accomplished with an outrigger structure extending along the sides of the vessel 1, where the shaker and baseplate assemblies could be raised at the sides of the vessel 1 at least partially into the outrigger structure. The outrigger structure, with attached, raised shaker/baseplate assemblies, preferably would not extend below the waterline to present unnecessary water drag when transiting. Such a structure would add significant weight to the vessel 1 which may have to be accounted for in overall vessel design. Such is not shown but is within the skill of the ordinary off-shore vessel construction company.

To avoid damaging the water bottom and to maintain very low ground pressure, each baseplate 12 preferably has a large area. The area of the baseplate 12 is sized to generate a very low effective ground pressure, preferably on the order of 1 to 3 psi (6.9 to 20.7 kPa) or lower. Thus ranges of size in width and length can typically be from 500 cm to 300 cm, preferably from 400 cm to 800 cm, and most preferably at least 500 cm to at least 400 cm but will depend largely upon the size of the vessel 1 and the type of water bottom 14 to be encountered. To further mitigate damage to the water bottom 14, the depth the baseplate 12 penetrates the water bottom 14 during transmission of a pressure pulse from the vibrator source and the hold-down force is monitored during operation. If the depth of penetration exceeds a user-specified amount, the system controls may be designed and set such that the source point is terminated or the force level of the generated signal is reduced. In cases where the baseplate penetrates the ocean bottom due to frequency induced soil liquefaction, a frequency-dependent force level and/or hold-down force change can be employed. Additionally or alternatively, time-variant sweep rates can be used to mitigate the soil liquefaction effects in accordance with the knowledge of those skilled in the art of vibroseis acquisition.

Thus in another embodiment, the water bottom penetration can be monitored and used to adjust the bottom pressure to minimize undue penetration. The simplest mechanism to measure the penetration of the baseplate 12 into the water bottom 14 is one or more low mass, sensing plates that are extendible beyond the baseplate 12, and to which is attached a rod connected to a syncro-resolver housed within the baseplate assembly. When the baseplate 12 is not loaded, the sensing plate would be mechanically even with the bottom of the baseplate 12. As the baseplate 12 penetrated into the water bottom 14, the sensing plate would be forced upwards with respect to the bottom of the baseplate 12. The amount of the baseplate penetration into the water bottom 14 can be computed by the rod length and the angle difference between the unloaded and loaded states by the syncro-resolver. A resulting signal would be sent to the vessel for decreasing pressure applied on the shaker 13 and baseplate 12 assembly. Typically one to four of these measuring devices would be attached to each of the one or more baseplates 12.

To generate a series of vibratory signal sweeps for the seismic data acquisition, the baseplate 12 will be lowered to the water bottom 14 and pressed down into the water bottom using the hold-down weight of the vessel 1. Thus the baseplate 12 will be held to the water bottom 14 with about 30,000 to 60,000 pounds (133.4 kN to 266.9 kN) of static force as the hold-down weight. Thus the vessel 1 will be firmly and stably connected to the water bottom 14 when operated in preferably mild to moderate weather and water surface conditions. The vibratory source (sources), comprising reaction mass and mechanical driver, typically would supply a peak dynamic force that is about 30% to 70% of the hold-down weight.

Generally the water bottom 14 in shallow water areas is expected to be compliant and relatively yielding. In some cases, the water bottom 14 will have a high clay content that can cause a significant adherence to be developed between the bottom of a baseplate 12 and the water bottom 14, either from a vacuum or adhesion to clay materials in the water bottom soil. When such adherence between the baseplate 12 and water bottom 14 occurs, the baseplate 12 would potentially be difficult to lift off of the water bottom 14. To alleviate or minimize this problem, the baseplate 12 may be supplemented with a sturdy, flexible membrane (not shown). The membrane is attached to the edges of the baseplate 12, or even covers the bottom of the baseplate 12, or any amount in between. If the membrane is held to the water bottom 14 when the baseplate 12 is to be lifted, the edges of the flexible membrane likely will lift first and break any vacuum or adhesion created. Preferably the membrane would be made of a rubber or thermoplastic elastomer material, or even thermoplastic materials that remain flexible at the water temperatures anticipated, this material selected for its ability to withstand contact with water or seawater without significant decomposition or degradation. Thus readily available hydrocarbon rubbers and thermoplastic elastomers are particularly suitable. This use of a flexible membrane has been successfully used on land vibrators operated on snow covered and on muddy ground surfaces.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A seismic source system for use in shallow water marine environments, comprising:
   (a) a vessel having at least one hull;
   (b) one or more shaker and baseplate assemblies affixed to the vessel by two or more rigid supporting elements adapted to be capable of lowering said assemblies from the vessel hull to a shallow water bottom and of raising said assemblies from the shallow water bottom to the hull;
   wherein each of said assemblies comprise one or more vibrator units mounted on a baseplate that is adapted to rest upon the shallow water bottom and to transmit vibratory signals from the vibrator units into said water bottom; and
   wherein the one or more baseplates have a combined face size area approximately equal to or greater than the at least one hull's water imprint area.

2. The seismic source system of claim 1 wherein said vessel is equipped with ballast water tanks to be used to trim the vessel and to provide hold-down weight.

3. The seismic source system of claim 1 wherein said vessel and said one or more rigid supporting elements are adapted to allow lifting of the vessel above its normal hull waterline to provide hold-down weight on the one or more shaker and baseplate assemblies.

4. The seismic source system of claim 1 wherein the rigid supporting elements are adapted to be capable of independent lifting to allow adjustment of baseplate alignment with the water bottom without significant change to the trim of the vessel.

5. The seismic source system of claim 1 wherein said vessel has two hulls and said one or more shaker and baseplate assemblies are of a size that when raised will fit within the space between the hulls.

6. The seismic source system of claim 1 where the vibrator units comprise P-wave shaker assemblies.

7. The seismic source system of claim 1 where the vibrator units comprise S-wave shaker assemblies.

8. The seismic source system of claim 1 where the vibrator units comprise at least one each of P-wave and S-wave shaker assemblies.

9. The seismic source system of claim 1 where the baseplate(s) is/are covered with flexible membrane adapted to be raised in parts until complete separation from the water bottom can be achieved where the water bottom makes separation difficult.

10. The seismic source system of claim 1 wherein at least one or more baseplate comprises at least one sensing plate attached to a rod connected to a syncro-resolver for determining the penetration of the baseplate into the water bottom.

11. The seismic source system of claim 1 where the vibrator is linear motor vibrator.

12. The seismic source system of claim 1 where the vibrator is an electro-hydraulic vibrator.

13. The method of claim 1, wherein each shaker and baseplate assembly is affixed to the vessel by at least two rigid supporting elements.

14. The method of claim 1, wherein each baseplate is sized in area to generate a ground pressure of less than approximately 3 psi (20.7 kPa).

15. The method of claim 14, wherein each baseplate has an area sized to generate a ground pressure of less than approximately 1 psi (6.9 kPa).

16. A seismic source system for use in shallow water marine environments, comprising:
   (a) a vessel having at least one hull;
   (b) one or more shaker and baseplate assemblies affixed to the vessel by two or more rigid supporting elements adapted to be capable of lowering said assemblies from the vessel hull to a shallow water bottom and of raising said assemblies from the shallow water bottom to the hull;
   wherein each of said assemblies comprise one or more vibrator units mounted on a baseplate that is adapted to rest upon the shallow water bottom and to transmit vibratory signals from the vibrator units into said water bottom; and
   wherein each baseplate is sized in area to have a length and width each at least 300 cm.

* * * * *